Feb. 28, 1956
A. L. DUNN
2,736,153
IGNITION SHORTING ATTACHMENT
FOR AN INTERNAL-COMBUSTION
POWERED LAWN MOWER
Filed Oct. 19, 1954
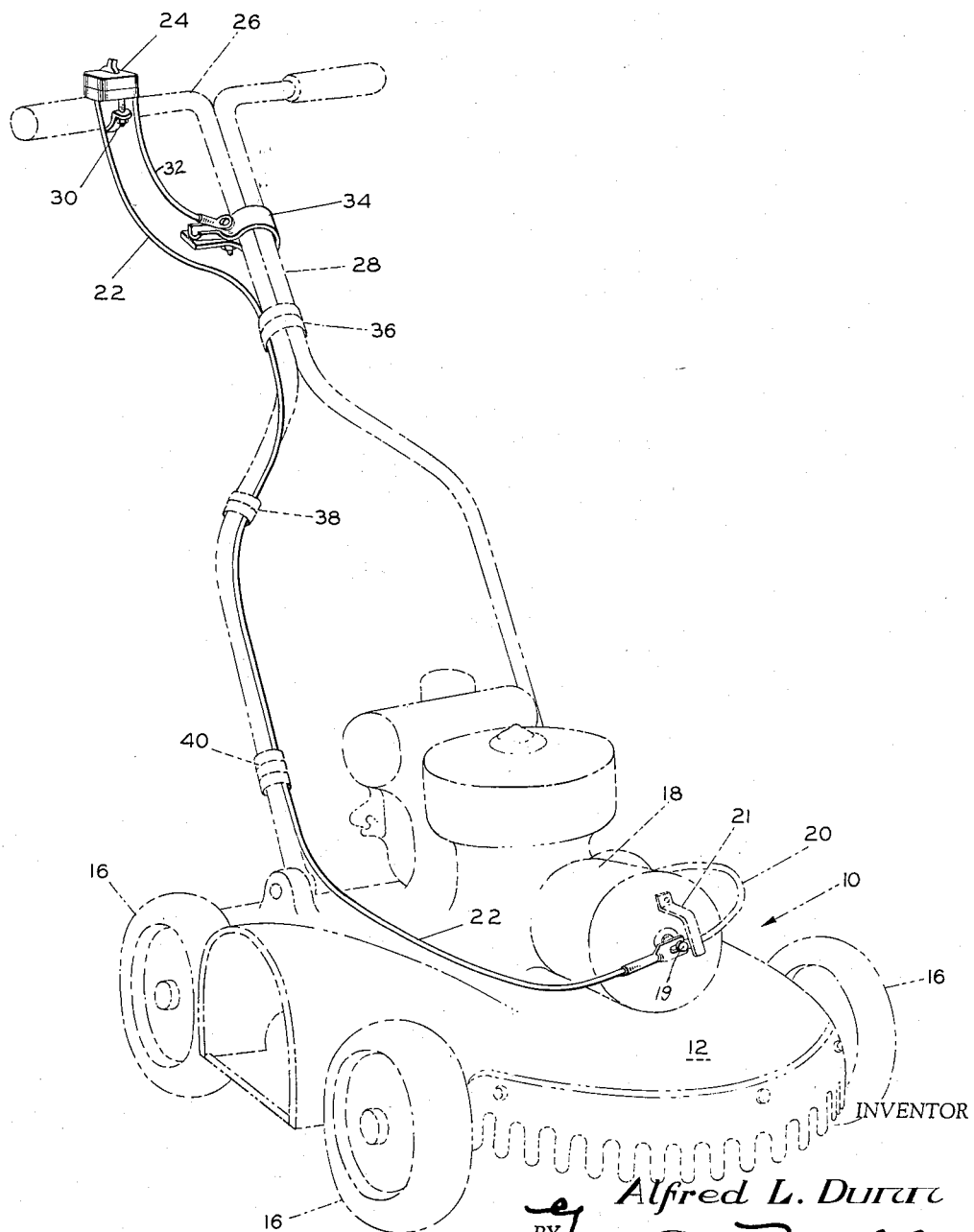
INVENTOR
Alfred L. Dunn
BY Gustav Miller
ATTORNEY

United States Patent Office 2,736,153
Patented Feb. 28, 1956

2,736,153

IGNITION SHORTING ATTACHMENT FOR AN INTERNAL-COMBUSTION POWERED LAWN MOWER

Alfred Louis Dunn, Washington, D. C.

Application October 19, 1954, Serial No. 463,245

1 Claim. (Cl. 56—25.4)

This invention relates to an ignition short circuiting attachment for a lawn mower, and particularly relates to a power lawn mower of the so-called "rotary blade" type wherein the blades revolve about an axis which is substantially vertical to the ground. More particularly, this invention relates to a switch attachment for shorting and stopping a lawn mower powered by an internal combustion engine of the gasoline type whereby there is provided an easily accessible safety switch means for the purpose of instantly stopping the engine and, thereby, also the machine itself, when necessary.

Gasoline powered lawn mowers, heretofore in general use, have all had the common disadvantage of being difficult to stop when an obstacle or other trouble is encountered. This is due to the fact that practically all rotary type mowers have direct drive and the only means for stopping them is a grounding leaf spring situated on the engine itself. When trouble is encountered, as when running into hidden wire, ropes, sticks, stones and the like, it is extremely difficult and very dangerous to obtain access to this stop means. For this reason, with the growing popularity of the rotary type mower, injury to the person and damage to the machine caused by the fast whirling rotary blades, is becoming more and more prevalent.

The principal object of the present invention, therefore, is to solve the above problem by providing a safety switch attachment for finger-tip control which is always within easy reach of the operator.

Another object of the present invention is to provide an easily accessible safety switch attachment for stopping the operation of the engine with a minimum of effort.

Another object of the present invention is to provide a mower powered by an internal combustion type engine wherein there is provided an easily accessible safety switch attachment for stopping the operation of the engine, and wherein the safety switch attachment is simple in construction and may be easily attached or detached to any existing lawn mower without the necessity of using any speical type tools.

Other objects of the present invention are to provide an improved power lawn mower easily accessible safety switch attachment that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawing in which:

The single figure illustrates a perspective view of a rotary type, gasoline powered lawn mower, to which is attached a safety switch attachment embodying the present invention, the mower, itself, being shown in dotted outline and the switch attachment in full line.

Referring now in greater detail to the drawing, there is shown a lawn mower, generally designated 10, including a hood 12, preferably of aluminum or the like, which encloses the rotary cutting blades, not shown. Wheels 16 are provided at opposite sides of the hood, in the ordinary manner, and on top of the hood is provided an internal combustion engine, generally designated 18. The engine is of the ordinary, gasoline powered type, and since, by itself, it comprises no part of the present invention, it is not considered necessary to describe it in detail. This engine operates to rotate the cutting device and to drive the mower over the ground in similar manner to many other types of gasoline powered mowers now in common use. The driving connections between the engine, the cutting device and the wheels are similar to those commonly found in the prior art and, by themselves, form no part of the present invention.

The engine 18, which, of course, is provided with a spark plug 19, to its spark plug wire 20 connected to the ignition in the usual manner and provided with the usual short circuiting leaf spring 21 for stopping the motor, the leaf spring being difficult of access in an emergency. A high tension wire 22 is connected at one coupling end to the spark plug 19 by its usual nut, and the other end of wire 22 is connected to one side of a large gap switch 24 which is mounted on the handle bar 26 of a handle frame 28 by a clamp 30. The gap switch 24 is considerably larger than the gap in the spark plug 19 so as to avoid accidental shorting. Connected to the other side of the switch 24 is a second high tension wire 32. The wire 32 is, in turn, connected to a grounding clamp 34. The clamp 34 is connected to the metallic mower handle frame 28. In order to prevent the long wire 22 from dangling and getting in the way of both the operator and the machine, and to provide a neat appearance, the intermediate portion of the wire is attached to the handle frame as by strips of plastic tape or the like indicated at 36, 38 and 40.

During the operation of the mower, when an obstruction or entanglement is encountered, the operator merely operates the switch 24, located on the handle bar, to short out the ignition and stop the operation of the engine through the grounding of the spark plug. This, of course, immediately causes the engine to cease functioning since there can no longer be any ignition of the fuel mixture. This is a far easier and safer operation than the usual operation of depressing leaf spring 21 into shorting connection to the spark plug 19. The cutting blades, being inoperative at this time, the mower can be safely manipulated to release it from the obstruction.

It is also within the scope of this invention to connect the switch 24 to the primary section of the magneto in the engine, where the voltage is low, instead of to the spark plug. However, it would be a difficult task for the average person to make such a connection, whereas the connection to the spark plug may be easily made by anyone in a matter of minutes. There is, furthermore, no necessity for using anything else than an ordinary screw driver or pliers when making the connection to the spark plug.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

An ignition shorting attachment for a power lawn mower of that type which includes a wheel supported frame of electrically conductive material, an angularly disposed conductive handle terminating in a transverse gripping bar, an internal combustion motor carried on said frame and a spark plug carried by said motor, said attachment comprising an insulated switch carried by said transverse gripping bar, an insulated wire connected to one side of said switch, a clip on the end of said wire connected to one terminal of said spark plug, a second insulated wire connected to the other side of said switch, and a clip on the end of said second wire connected to said conductive handle, whereby closure of said switch to place said wire in electrical association grounds said spark plug and short-circuits the ignition.

References Cited in the file of this patent

UNITED STATES PATENTS

| | | |
|---|---|---|
| 1,140,317 | Robinson | May 18, 1915 |
| 1,344,369 | Zehringer | June 22, 1920 |
| 1,359,291 | Tripp | Nov. 16, 1920 |
| 2,011,123 | Shilson et al. | Aug. 13, 1935 |
| 2,013,294 | Thibault | Sept. 3, 1935 |
| 2,257,033 | Bissell | Sept. 23, 1941 |
| 2,598,091 | Ahlgrim | May 27, 1952 |
| 2,621,568 | Fletcher | Dec. 16, 1952 |